(12) United States Patent
Takeda et al.

(10) Patent No.: US 11,089,574 B2
(45) Date of Patent: Aug. 10, 2021

(54) USER TERMINAL, RADIO BASE STATION AND RADIO COMMUNICATION METHOD

(71) Applicant: NTT DOCOMO, INC., Tokyo (JP)

(72) Inventors: Kazuaki Takeda, Tokyo (JP); Shimpei Yasukawa, Tokyo (JP); Hideyuki Moroga, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/524,641

(22) PCT Filed: Oct. 9, 2015

(86) PCT No.: PCT/JP2015/078742
§ 371 (c)(1),
(2) Date: May 5, 2017

(87) PCT Pub. No.: WO2016/072216
PCT Pub. Date: May 12, 2016

(65) Prior Publication Data
US 2017/0347350 A1    Nov. 30, 2017

(30) Foreign Application Priority Data

Nov. 6, 2014   (JP) .............................. JP2014-226412
Apr. 9, 2015   (JP) ................................. 2015-080327

(51) Int. Cl.
*H04W 72/00*    (2009.01)
*H04W 72/04*    (2009.01)
(Continued)

(52) U.S. Cl.
CPC ....... *H04W 72/0406* (2013.01); *H04W 72/04* (2013.01); *H04W 72/0453* (2013.01);
(Continued)

(58) Field of Classification Search
USPC .......................... 455/452; 370/329, 328, 330
See application file for complete search history.

(56) References Cited

U.S. PATENT DOCUMENTS 8,797,977 B2    8/2014 Aiba et al.
8,892,113 B2 *  11/2014 Ratasuk ............ H04W 72/0486
                                                    455/452.2
(Continued)

FOREIGN PATENT DOCUMENTS

WO    2010/027035 A1    3/2010
WO    2013/111843 A1    8/2013
(Continued)

OTHER PUBLICATIONS

Office Action issued in corresponding Japanese Patent Application No. 2016-557517, dated Sep. 12, 2017 (9 pages).
(Continued)

*Primary Examiner* — David Q Nguyen
(74) *Attorney, Agent, or Firm* — Osha Bergman Watanabe & Burton LLP

(57) ABSTRACT

The present invention is designed to optimize the uplink access procedure even when the band to use is limited to partial narrow bands in a system band. A user terminal, in which the band to use is limited to a partial narrow band in a system band, has a receiving section that receives system information that includes indication information of an uplink carrier frequency, from a radio base station, as system information for narrow bands, which is different from system information for the system band, and a transmission section that transmits a random access preamble to the radio base station in one of a plurality of narrow bands that are specified by the indication information of the uplink carrier frequency.

4 Claims, 12 Drawing Sheets

(51) Int. Cl.
*H04W 72/12* (2009.01)
*H04W 74/08* (2009.01)
*H04W 4/70* (2018.01)

(52) U.S. Cl.
CPC ....... *H04W 72/12* (2013.01); *H04W 74/0833* (2013.01); *H04W 4/70* (2018.02); *H04W 74/08* (2013.01)

(56) References Cited

U.S. PATENT DOCUMENTS

| | | | | |
|---|---|---|---|---|
| 9,504,034 | B2* | 11/2016 | Horn | H04W 4/90 |
| 9,510,132 | B2* | 11/2016 | Xu | H04W 48/12 |
| 9,839,019 | B2* | 12/2017 | Webb | H04W 4/70 |
| 2011/0261763 | A1* | 10/2011 | Chun | H04W 74/008 370/329 |
| 2011/0280212 | A1* | 11/2011 | Lv | H04W 74/002 370/329 |
| 2013/0077584 | A1* | 3/2013 | Lee | H04W 74/0833 370/329 |
| 2013/0083749 | A1* | 4/2013 | Xu | H04W 74/0833 370/329 |
| 2014/0112286 | A1 | 4/2014 | Ahn et al. | |
| 2014/0241297 | A1* | 8/2014 | Park | H04W 74/0833 370/329 |
| 2014/0293946 | A1* | 10/2014 | Suzuki | H04L 5/0053 370/329 |
| 2015/0156760 | A1* | 6/2015 | Yu | H04W 72/0453 370/330 |
| 2015/0305014 | A1 | 10/2015 | Li et al. | |
| 2017/0279646 | A1* | 9/2017 | Yi | H04L 5/0007 |
| 2018/0055223 | A1* | 3/2018 | Webb | H04W 4/70 |
| 2018/0235013 | A1* | 8/2018 | Jung | H04W 74/0833 |

FOREIGN PATENT DOCUMENTS

| | | |
|---|---|---|
| WO | 2014/096766 A1 | 6/2014 |
| WO | 2014/110772 A1 | 7/2014 |

OTHER PUBLICATIONS

Huawei, et al., "PRACH resource multiplexing to support low cost MTC and coverage enhancement", 3GPP TSG RAN WG1 Meeting #76, R1-140027, Prague, Czech Republic, Feb. 10-14, 2014 (6 pages).
LG Electronics, "Common message and signal transmission for MTC", 3GPP TSG RAN WG1 Meeting #78bis, R1-144039, Ljubljana, Slovenia, Oct. 6-10, 2014 (5 pages).
International Search Report issued in corresponding application No. PCT/JP2015/078742 dated Dec. 22, 2015 (2 pages).
Written Opinion of the International Searching Authority issued in corresponding application No. PCT/JP2015/078742 dated Dec. 22, 2015 (4 pages).
3GPP TS 36.300 V8.5.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; May 2008 (134 pages).
3GPP TR 36.888 V12.0.0, "3rd Generation Partnership Project; Technical Specification Group Radio Access Network; Study on provision of low-cost Machine-Type Communications (MTC) User Equipments (UEs) based on LTE (Release 12)"; Jun. 2013 (55 pages).
Extended European Search Report issued in corresponding European Patent Application No. 15856467.4, dated May 9, 2018 (11 pages).
Alcatel-Lucent et al., "PRACH Coverage Enhancement for MTC UE", 3GPP TSG-RAN WG1 Meeting #75, R1-135155, San Francisco, USA, Nov. 11-15, 2013 (8 pages).
Office Action issued in corresponding Japanese Patent Application No. 2016-557517, dated Jan. 23, 2018 (6 pages).
Office Action issued in the counterpart European Patent Application No. 15856467.4, dated Apr. 3, 2019 (6 pages).
Office Action issued in the counterpart European Patent Application No. 15856467.4, dated Feb. 27, 2020 (6 pages).
Office Action issued in Chinese Application No. 201580060257.9; dated Jun. 29, 2020 (18 pages).
Office Action issued in the counterpart Japanese Patent Application No. 2018-082517, dated Feb. 26, 2019 (8 pages).
Office Action issued in the counterpart Japanese Patent Application No. 2018-082517, dated Oct. 1, 2019 (9 pages).
CATT; "Further details on NR 4-step RA Procedure"; 3GPP TSG RAN WG1 Meeting #92, R1-1801712; Athens, Greece, Feb. 26-Mar. 2, 2018 (7 pages).
Office Action issued in the counterpart Japanese Patent Application No. 2018-082517, dated Oct. 6, 2020 (5 pages).
Qualcomm Europe; "Details on UL grant portion of RACH MSG2"; 3GPP TSG-RAN WG1 #53, R1-081977; Kansas City, USA, May 5-9, 2008 (3 pages).
Office Action in counterpart Japanese Patent Application No. 2018-082517 dated May 12, 2020 (4 pages).
Office Action issued in Chinese Application No. 201580060257.9, dated Feb. 23, 2021 (13 pages).
Notice of Reasons for Refusal issued in Application No. 2018-82517, dated Mar. 9, 2021 (10 pages).
Office Action issued in the counterpart European Patent Application No. 15856467.4, dated Jan. 22, 2021 (6 pages).

* cited by examiner

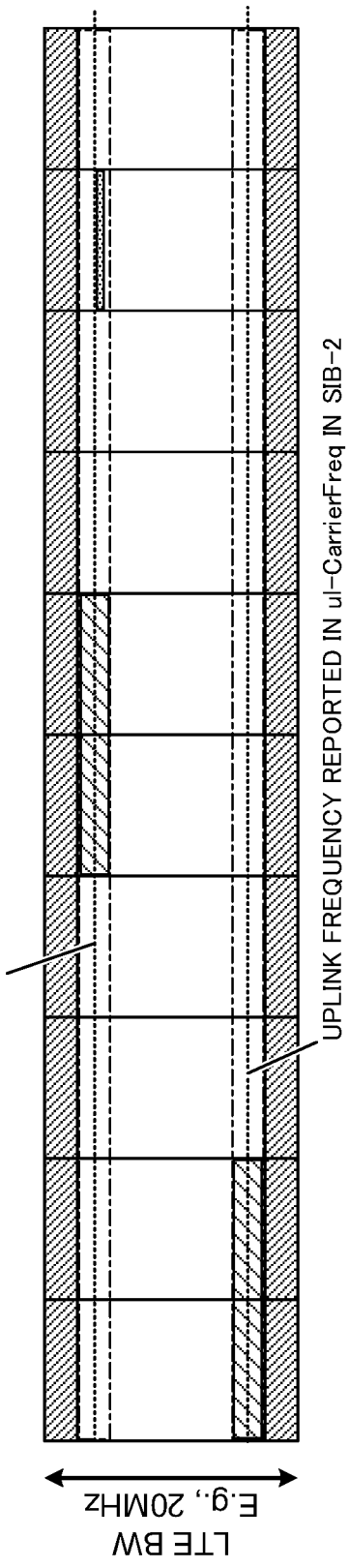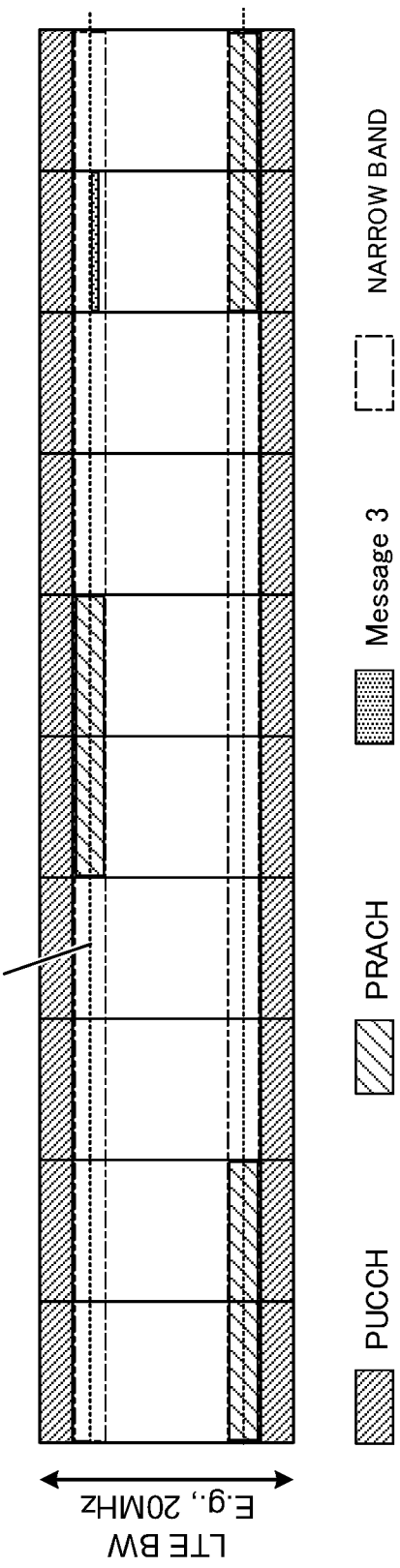

USER TERMINAL, RADIO BASE STATION AND RADIO COMMUNICATION METHOD

TECHNICAL FIELD

The present invention relates to a user terminal, a radio base station and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower delays and so on (see non-patent literature 1). Also, successor systems of LTE (also referred to as, for example, "LTE-advanced" (hereinafter referred to as "LTE-A"), "FRA" (Future Radio Access) and so on) are under study for the purpose of achieving further broadbandization and increased speed beyond LTE.

Now, accompanying the cost reduction of communication devices in recent years, active development is in progress in the field of technology related to machine-to-machine communication (M2M) to implement automatic control of network-connected devices and allow these devices to communicate with each other without involving people. In particular, of all M2M, 3GPP (3rd Generation Partnership Project) is promoting standardization with respect to the optimization of MTC (Machine-Type Communication), as a cellular system for machine-to-machine communication (see non-patent literature 2). MTC terminals are being studied for use in a wide range of fields, such as, for example, electric (gas) meters, vending machines, vehicles and other industrial equipment.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"
Non-Patent Literature 2: 3GPP TS 36.888 "Study on provision of low-cost Machine-Type Communications (MTC) User Equipments (UEs) based on LTE (Release 12)"

SUMMARY OF INVENTION

Technical Problem

From the perspective of reducing the cost and improving the coverage area in cellular systems, amongst all MTC terminals, low-cost MTC terminals (low-cost MTC UEs) that can be implemented in simple hardware structures have been increasing in demand. Low-cost MTC terminals can be implemented by limiting the band to use for a physical downlink shared channel (PDSCH) to a portion of a system band. However, existing uplink access procedures, which are designed based on system bands, cannot be applied, how to optimize the uplink random access procedure for user terminals in which the band to use is limited is a remaining problem.

The present invention has been made in view of the above, and it is therefore an object of the present invention to provide a user terminal, a radio base station and a radio communication method that can optimize the uplink random access procedure even when the bandwidth is limited to narrow bands in a system band.

Solution to Problem

According to the present invention, a user terminal, in which the bandwidth is limited to a narrow band in a system band, has a receiving section that receives system information that includes indication information of an uplink carrier frequency, from a radio base station, as system information for narrow bands, which is different from system information for the system band, and a transmission section that transmits a random access preamble to the radio base station in one of a plurality of narrow bands that are specified by the indication information of the uplink carrier frequency.

Advantageous Effects of Invention

According to the present invention, a user terminal receives system information for narrow bands from a radio base station, so that the user terminal can transmit random access preambles to the radio base station by using a plurality of narrow bands that are specified by information that indicates uplink carrier frequencies. A frequency diversity effect can be achieved by using a plurality of narrow bands, so that it is possible to start the random access procedure while the spectral efficiency is improved.

BRIEF DESCRIPTION OF DRAWINGS

FIG. 5 provide diagrams to show random access by MTC terminals according to the present embodiment.

DESCRIPTION OF EMBODIMENTS

A study in progress to limit the processing capabilities of terminals by making the peak rate low, limiting the resource blocks, allowing limited RF reception and so on, in order to reduce the cost of MTC terminals. For example, the maximum transport block size in unicast transmission using a downlink data channel (PDSCH: Physical Downlink Shared Channel) is limited to 1000 bits, and the maximum transport block size in BCCH transmission using a downlink data channel is limited to 2216 bits. Furthermore, the downlink data channel bandwidth is limited to 6 resource blocks (also referred to as "RBs" (Resource Blocks), "PRBs" (Physical Resource Blocks), etc.). Furthermore, the RFs to receive in MTC terminals are limited to one.

Furthermore, the transport block size and the resource blocks in low-cost MTC terminals (low-cost MTC UEs) are more limited than in existing user terminals, and therefore low-cost MTC terminals cannot connect with cells in compliance with LTE Rel. 8 to 11. Consequently, low-cost MTC terminals connect only with cells where a permission of access is reported to the low-cost MTC terminals in broadcast signals. Furthermore, a study is in progress to limit not only downlink data signals, but also various control signals that are transmitted on the downlink (such as system information, downlink control information and so on), data signals and various control signals that are transmitted on the uplink, and/or other signals to predetermined narrow bands (for example, 1.4 MHz).

Such band-limited MTC terminals need to be operated on the LTE system band, considering the relationship with existing user terminals. For example, in a system band, frequency-multiplexing of band-limited MTC terminals and band-unlimited existing user terminals is supported. Furthermore, the band-limited user terminals can only support predetermined narrow-band RFs in the uplink and the downlink. Here, the MTC terminals are terminals in which the band to use is limited to partial narrow bands within the system band, and the existing user terminals are terminals in which the system band is the band to use.

That is, the upper limit of the band for use by MTC terminals is limited to narrow bands, and, for existing user terminals, the system band is configured as the upper limit of the band to use. MTC terminals are designed presuming narrow bands, and therefore the hardware structure is simplified, and their processing capabilities are low compared to existing user terminals. Note that MTC terminal may be referred to as "MTC UEs." Existing user terminals may be referred to as "normal UEs," "non-MTC UEs," category 1 UEs" and so on.

Figure 1A:
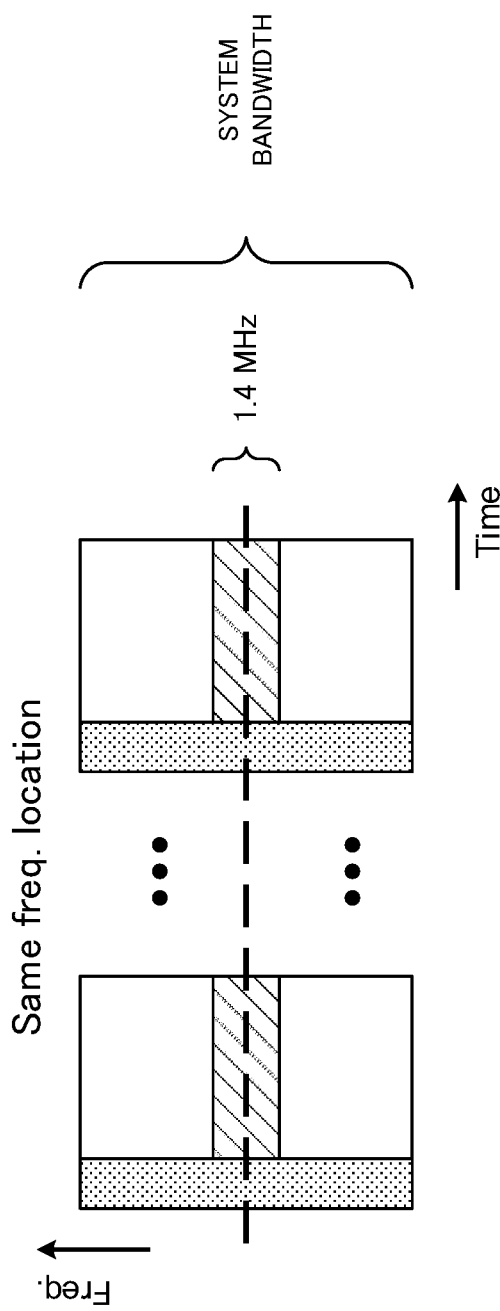
FIG. 1 provide diagrams, each showing an example of the arrangement of narrow bands in a downlink system band.
Figure 1B:
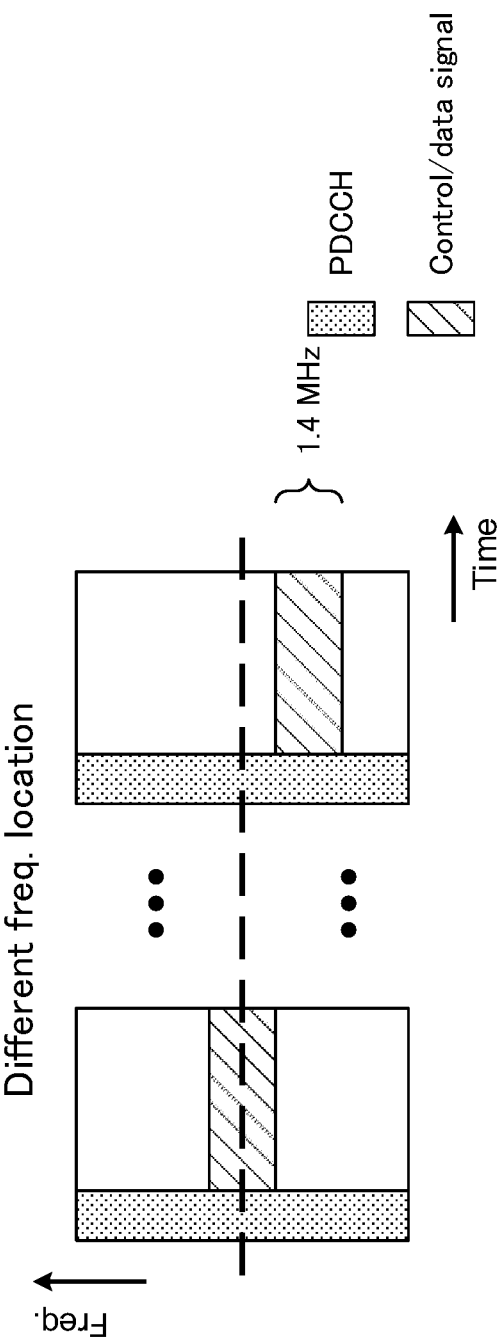

Now, the arrangement of narrow bands in a downlink system band will be described with reference to FIG. 1 and FIG. 2. As shown in FIG. 1A, the band for use for MTC terminals is limited to a partial narrow band (for example, 1.4 MHz) in a system band. When a narrow band is fixed in a predetermined frequency location in a system band, no frequency diversity effect can be achieved, and therefore the spectral efficiency might decrease. On the other hand, as shown in FIG. 1B, when a narrow band to constitute the band to use changes its frequency location in every subframe, a frequency diversity effect can be achieved, and therefore the decrease of spectral efficiency can be reduced.

Figure 2:
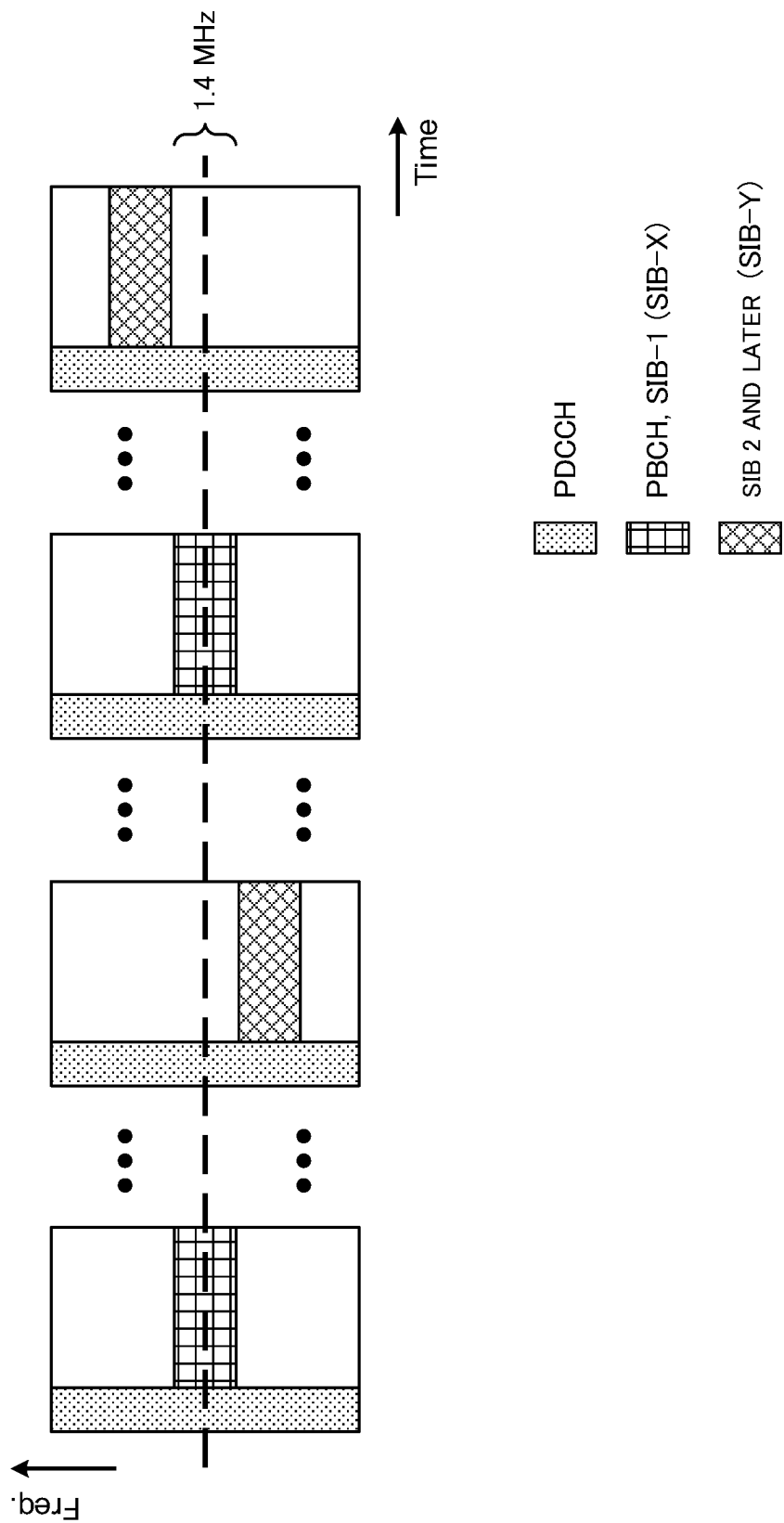
FIG. 2 is a diagram to show another example of the arrangement of narrow bands in a downlink system band.

For example, when, as shown in FIG. 2, broadcast information is transmitted by changing the frequency location of a narrow band every subframe, system information such as the PBCH (Physical Broadcast Channel) signal and SIB (System Information Block)-1, and system information such as SIB-2 and subsequent information are transmitted in different frequency locations. System information such as the PBCH may be transmitted to a user terminal in idle mode in the narrow band at the center frequency location of a system band. In this case, if information to indicate the frequency locations of subsequent SIBs can be placed in broadcast information such as the PBCH signal and SIB-1, it is possible to change the frequency locations of subsequent SIBs.

Now, when a user terminal conducts cell search, although, in the downlink, frequency synchronization can be established using the PSS (Primary Synchronization Signal) and the SSS (Secondary Synchronization Signal), there are no such synchronization signals in the uplink. Consequently, in the uplink, frequency synchronization is established by executing a random access procedure between user terminals and radio base stations. Now, uplink frequency synchronization by existing user terminals will be briefly described below.

Figure 3:
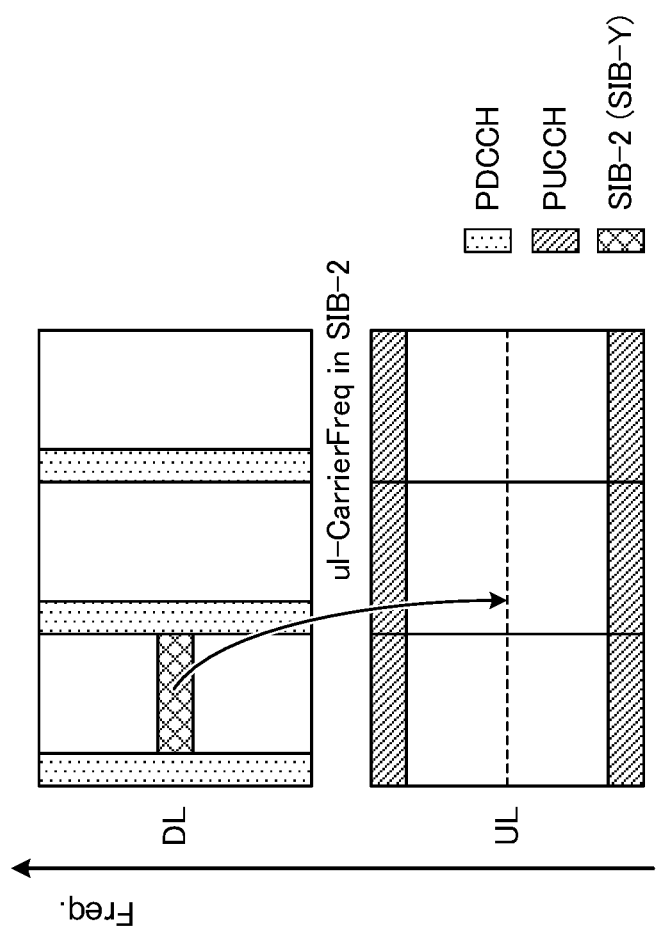
FIG. 3 is a diagram to explain uplink frequency synchronization using a comparative example.

As shown in FIG. 3, when an existing user terminal establishes frequency synchronization in the uplink, the user terminal captures synchronization in the downlink, receives broadcast information from the radio base station, and acquires the system information. SIB (System Information Block)-2, which serves as system information, includes the uplink carrier frequency, bandwidth-specifying information (ul-CarrierFreq, ul-Bandwidth, etc.). The uplink carrier frequency and the bandwidth are reported to the user terminal by means of SIB-2, and, using the uplink carrier frequency and the bandwidth reported, the random access procedure and others are executed. Note that the uplink carrier frequency value is reported in, for example, ARFCN (Absolute Radio Frequency Channel Number)-value EUTRA.

However, existing system information is designed based on system bands, and therefore user terminal that only support narrow bands such as MTC terminals are not fully compatible with this. For example, even when a narrow band that constitutes the band to use changes its frequency location over time or when a plurality of narrow bands for MTC terminals are configured in order to achieve a frequency diversity effect, there is no established method for reporting uplink carrier frequencies. The present inventors have arrived at the present invention in order to reduce the deterioration of received quality that results from limiting the band for use by user terminals to a predetermined partial narrow band in a system band, and to establish the random access procedure for use when a plurality of narrow bands for MTC terminals are configured.

According to one aspect of the present invention, it is possible to define new system information (SIBs) for narrow bands, and carry out an uplink random access procedure in a plurality of narrow bands that are specified by new system information for narrow bands, which is different from the system information for system bands. Note that, although MTC terminals will be shown as exemplary user terminals in the following description, any user terminals can be used as long as the band to use is limited to partial narrow bands in a system band. Also, although a contention-based random access procedure will be shown as an example, the present invention is equally applicable to a non-contention-based random access procedure as well.

Now, the uplink frequency synchronization and the random access procedure according to the present embodiment will be described below with reference to FIG. 4 and FIG. 5. FIG. 4 provide diagrams to explain the uplink frequency synchronization according to the present embodiment. FIG. 5 provide diagrams to explain the random access procedure by an MTC terminal according to the present embodiment. Note that, although FIG. 5 show configurations in which the narrow band for the PRACH is configured in two consecutive subframes, these configurations are by no means limiting. It is equally possible to configure the narrow band for the PRACH in every one subframe.

Figure 4A:
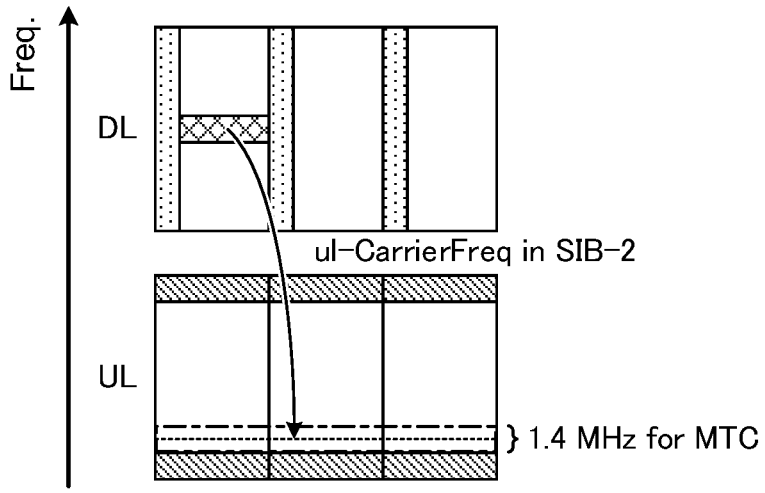
FIG. 4 provide diagrams to explain uplink frequency synchronization according to the present embodiment.

As shown in FIG. 4A, in uplink frequency synchronization by an MTC terminal, after synchronization is captured in the downlink, broadcast information and system information are reported. Also, an SI-RNTI (System Information Radio Temporary Identifier) is detected in the common search space of a downlink control channel (EPDCCH: Enhanced Physical Downlink Control Channel). Then, the SIBs for MTC (for narrow bands) are demodulated, based on the SI-RNTI, as narrow band system information that is allocated on a data channel (PDSCH). In this case, a uniform bandwidth is applied (1.4 MHz), and therefore it is not necessary to report the bandwidth in the MTC SIBs.

The SIBs for MTC include the frequency value of the uplink carrier frequency as indication information of an uplink carrier frequency (ul-CarrierFreq). The location of the narrow band's fundamental frequency is specified based on this frequency value, and the uplink narrow band at the fundamental frequency location is configured as the narrow band for the PRACH (Physical Random Access Channel). Then, a random access preamble is transmitted from the MTC terminal to the radio base station in the narrow band for the PRACH, and the random access procedure is started. Note that a random access preamble may be referred to as a "message 1," or may be referred to simply as a "RACH." Also, an SIB that serves as system information for narrow bands may be referred to as "MTC SIB-2" or "MTC SIB."

In this case, if the frequency value of the uplink carrier frequency is configured at the center of the system band, the uplink resources for LTE are divided by the narrow band for the RACH. It then follows that it is more preferable to configure the frequency values of uplink carrier frequencies so that the narrow band adjoins the band for an uplink control channel (PUCCH: Physical Uplink Control Channel) placed on either edge of the system band. By this means, the narrow band for the RACH is placed to adjoin the inner side of the uplink control channel band, hence not dividing the uplink resources, and not damaging the performance of single-carrier communication.

Thus, MTC SIBs are newly set forth as system information that is especially for MTC terminals in which the band to use is limited to narrow bands. As described above, the new SIBs contain indication information of an uplink carrier frequency (ul-CarrierFreq), but do not include bandwidth-specifying information (ul-Bandwidth), and therefore the amount of information is reduced compared to conventional SIBs. By removing unnecessary information in MTC terminals, it then becomes possible to prevent the coding rate and MCS from being too high, and to reduce the deterioration of received quality. However, if MTC terminals, having no mobility, can use only a partial narrow band in a system band, a frequency diversity effect cannot be achieved.

Figure 4B:
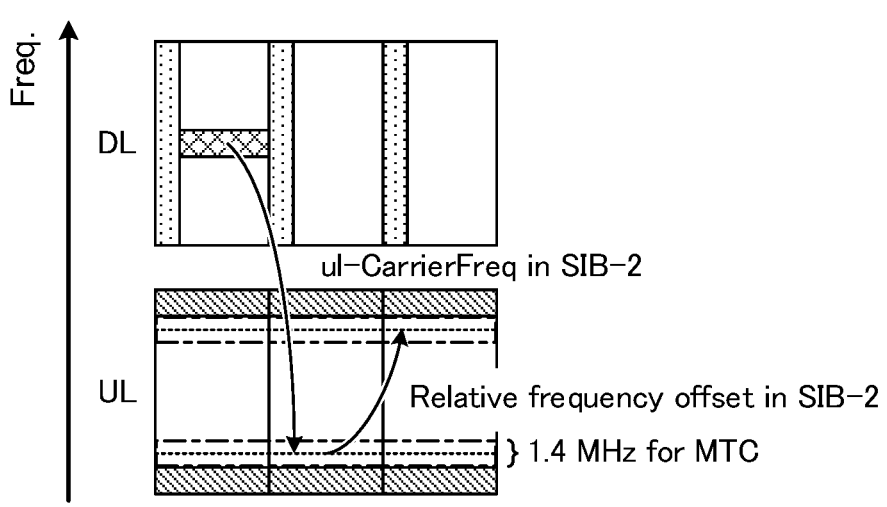

So, the present embodiment is designed so that, as shown in FIG. 4B, MTC terminals can use a plurality of narrow bands (resources) in a system band. A plurality of PRACH narrow bands are configured to adjoin the uplink control channel band placed on either edge of a system band so as not to reduce the uplink resources. In this case, a plurality of frequency values of uplink carrier frequencies may be included in an MTC SIB as indication information of an uplink carrier frequency, or the frequency value of an uplink carrier frequency may be included, with an addition of an offset value to apply to the frequency value. Note that the offset value may be referred to as a "relative frequency offset."

In the former case, the narrow band for the PRACH is configured in a plurality of fundamental frequency locations specified by the plurality of frequency values of uplink carrier frequencies. In the latter case, the narrow band for the PRACH is configured in the fundamental frequency location that is specified by the frequency value of an uplink carrier frequency, and in another fundamental frequency location that is specified by applying the offset value to the frequency value of the uplink carrier frequency. Then, in one of the multiple narrow bands configured for the PRACH, a random access preamble is transmitted from the MTC terminal to the radio base station, and thereupon the random access procedure is started. Note that the indication information of an uplink carrier frequency may be any information as long as it can specify a plurality of narrow bands.

In this way, a plurality of narrow bands can be used for the PRACH, so that it is possible to achieve a frequency diversity effect. Even when a random access preamble is transmitted in one of a plurality of PRACH narrow bands and the transmission of this random access preamble fails, it is still possible to transmit the random access preamble in another one of the plurality of narrow bands in a subsequent subframe. Although, in this case, the frequency tuning that has to be applied upon hopping among a plurality of narrow bands takes time, since random access preambles are not transmitted frequently, this frequency tuning can be executed between transmissions of random access preambles.

Note that, although the present embodiment is structured so that the narrow band for the PRACH is configured to adjoin the uplink control channel band placed on either edge of a system band, this structure is by no means limiting. The narrow band for the PRACH does not have to be placed to adjoin the uplink control channel band. Also, given that the narrow band for the PRACH is shared among a plurality of MTCs, it might occur that the resources run out. In this case, more bands may be reserved on the inner side of the narrow band for the PRACH. For example, in addition to the use of broadcast signals, it may be possible to report additional narrow bands by using RRC signaling, and reserve these narrow bands.

Figure 4C:
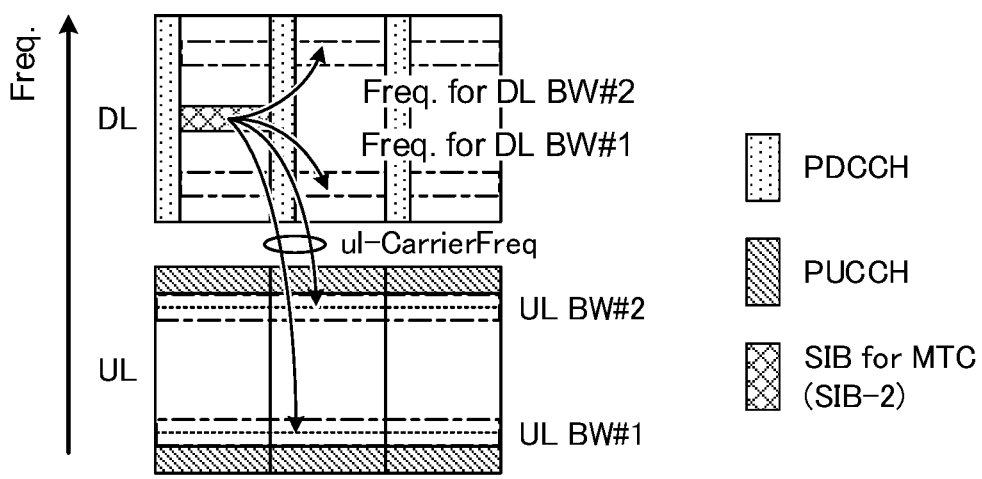

Furthermore, as shown in FIG. 4C, not only uplink narrow bands, but also downlink narrow bands may be configured by using an MTC SIB. In this case, an MTC SIB includes indication information of a downlink frequency, in addition to indication information of an uplink carrier frequency (ul-CarrierFreq). By using this MTC SIB, uplink narrow bands and downlink narrow bands are configured at the same in the system band. Also, in the downlink, too, as in the uplink, it is preferable to enable band-limited MTC terminals to use a plurality of narrow bands (resources) in the system band. Note that a downlink frequency may be referred to as a "downlink carrier frequency."

For example, UL BWs #1 and #2 are used as uplink narrow bands and downlink narrow bands are used as DL BWs #1 and #2. By this means, it is possible to reduce the load when the number of MTC terminals increases. In the event of coverage enhancement mode, a frequency diversity effect and scheduling gain can be achieved by repeating transmitting signals by using a plurality of narrow bands. Note that the indication information of a downlink frequency may include, for example, a downlink frequency value and an offset value to apply to the frequency value. Downlink narrow bands are configured in the fundamental frequency locations specified by the downlink frequency value and the offset. Also, the indication information of a downlink frequency may be reported in a different SIB from the SIB in which indication information of an uplink carrier frequency is included.

As shown in FIG. 5A, when a plurality of narrow bands for the PRACH are reserved in a system band, after the transmission of a random access preamble fails in one PRACH narrow band, the random access preamble is transmitted in another PRACH narrow band. By this means, the receipt of random access preambles can be made more reliable. In this case, if a random access preamble is transmitted from an MTC terminal to a radio base station, a random access response (RAR) is transmitted from the radio base station to the MTC terminal as an acknowledgment signal in response to the random access preamble.

In the normal random access procedure, when an RA-RNTI (Random Access Radio Temporary Identifier) is detected in the common search space of a downlink control channel (EPDCCH), resources on a data channel (PDSCH) are specified for allocating a random access response. Based on this, then, the resources for the random access response need to be designated in the downlink control channel, which involves complex control. So, according to the present embodiment, the radio base station may transmit a random access response in downlink resources that are linked with the signal sequence and/or the frequency of a random access preamble (see FIG. 6). By this means, the MTC terminal can specify the resources to allocate a random access response without detecting an RA-RNTI. In this case, although the MTC terminal detects the PDSCH by blind detection, it is equally possible to multiply the CRC bit of the PDSCH by an identifier or an RA-RNTI for identifying a random access response.

Also, a random access response includes, for example, the following parameters. In this example, the assignment of resource blocks (fixed size resource block assignment) can be reduced in accordance with the narrow band. For example, if six resource blocks are used as the resource blocks for the PRACH, the resource block assignment can be reduced from ten bits to three bits.

Hopping flag: 1 bit
Fixed size resource block assignment: 10 bits
Truncated modulation and coding scheme: 4 bits
TPC command for scheduled PUSCH: 3 bits
UL delay: 1 bit
CSI request: 1 bit Note that it is possible to remove unnecessary information and reduce the number of bits in random access responses as appropriate, or not include information in random access responses, as will be described later. By reducing the amount of information in random access responses, it is possible prevent the coding rate and MCS from becoming too high, and reduce the deterioration of received quality. A random access response may be referred to as a "random access response grant" or a "message 2."

Figure 6:
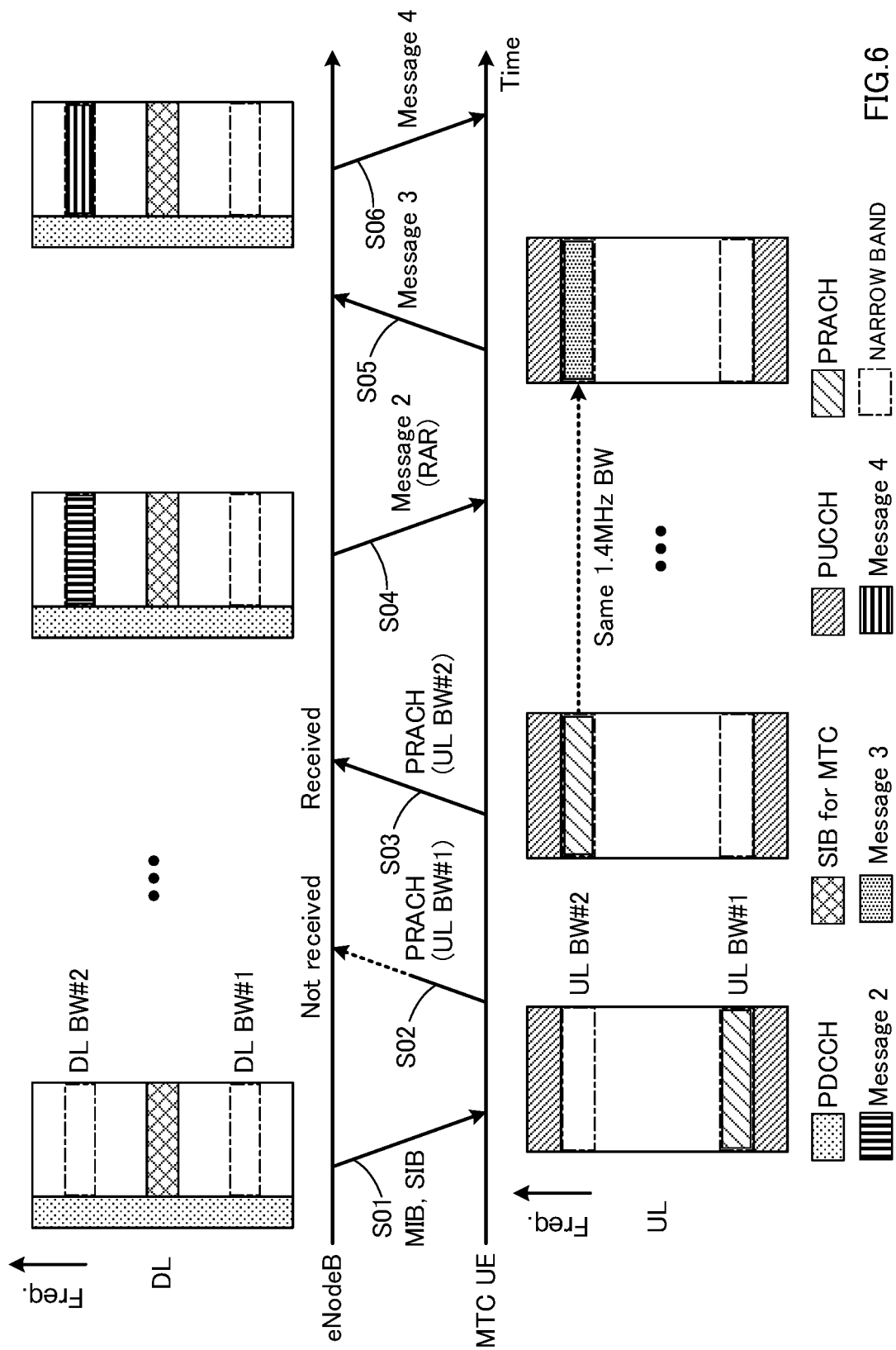
FIG. 6 is a diagram to show the flow of a random access procedure according to the present embodiment.

As shown in FIG. 5B, when a random access response is transmitted from the radio base station to the MTC terminal, a connection request message is transmitted from the MTC terminal to the radio base station as an acknowledgment signal in response to the random access response (see FIG. 6). In this case, the MTC terminal may transmit the connection request message to the radio base station by using the PRACH narrow band in which the MTC terminal transmitted the immediately-preceding random access preamble. The narrow band in which the immediately-preceding random access preamble was received adequately in the radio base station is likely to lead to reliable receipt, so that, by using this narrow band, the reliability of the connection request message can be improved.

Although a connection request message is transmitted by using resources indicated by the random access response, the amount of information, including the resources to allocate and so on, can be reduced because the narrow band for the PRACH is narrow. Also, when a connection request message is transmitted from the MTC terminal to the radio base station under predetermined conditions, it is possible to send a random access response without including information therein, and make the MTC terminal recognize only the receipt of the random access response. Note that a connection request message may be referred to as an "RRC connection request message," "scheduled transmission," or a "message 3."

Now, the flow of the random access procedure will be described with reference to FIG. 6. FIG. 6 is a diagram to show the flow of the random access procedure according to the present embodiment. Note that the following random access procedure only shows an example of random access to use a plurality of narrow bands in a system band, and this is by no means limiting.

As shown in FIG. 6, the MIB (Master Information Block) and SIBs (System Information Blocks) are transmitted from a radio base station (eNodeB) to an MTC terminal (MTC UE) via the downlink (step S01). Information that is necessary to receive SIBs is broadcast to the MTC terminal in the MIB, and, based on the MIB, the MTC terminal receives the subsequent SIBs. In this case, amongst the subsequent SIBs, the SIBs for MTC are received in the MTC terminal as system information for narrow bands. By this means, uplink narrow bands UL BWs #1 and #2 and downlink narrow bands DL BWs #1 and #2 to use in the random access procedure are configured.

Next, in uplink narrow band UL BW #1, a random access preamble ("PRACH," "Message 1," etc.) is transmitted from the MTC terminal to the radio base station (step S02). If the random access preamble is not received in the radio base station, the random access preamble is transmitted from the MTC terminal to the radio base station in uplink narrow band UL BW #2 (step S03). If the random access preamble is received in the radio base station, a random access response ("message 2") is transmitted from the radio base station to the MTC terminal in downlink narrow band DL BW #2, which is linked with the random access preamble's sequence or frequency (step S04).

In this way, according to the present embodiment, uplink narrow band UL BW #1 and downlink narrow band DL BW #1 are linked, and uplink narrow band UL BW #2 and downlink narrow band DL BW #2 are linked. The MTC terminal can identify the resources for allocating the random access response without detecting an RA-RNTI and so on, and therefore it is not necessary to designate the resources to allocate the random access response in a downlink control channel.

Next, when the random access response is received in the MTC terminal, a connection request message ("message 3") is transmitted from the MTC terminal to the radio base station in the same narrow band—UL BW #2—as used for the immediately-preceding random access preamble (step S05). By this means, the connection request message is transmitted in narrow band UL BW #2, in which the random access preamble was delivered to the radio base station, so that the reliability of the receipt of the connection request message is improved. Next, when the connection request message is received in the radio base station, a setup message ("contention resolution," "message 4," etc.) is transmitted from the radio base station to the MTC terminal in the same narrow band—DL BW #2—as used for the random access response (step S06).

Figure 7:
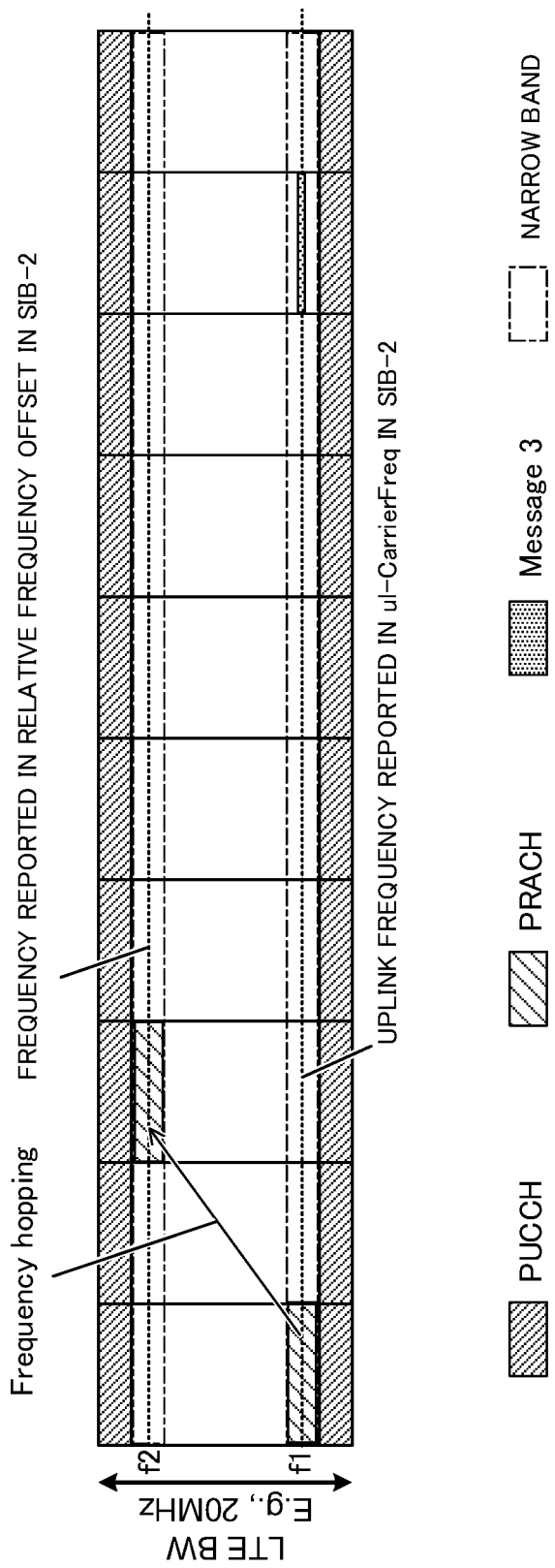
FIG. 7 is a diagram to show and explain another example of random access by MTC terminals according to the present embodiment.

Although an example has been described with the above embodiment in which an MTC terminal transmits a connection request message (message 3) to a radio base station by using the frequency in which the immediately-preceding random access preamble was transmitted, this configuration is by no means limiting. As shown in FIG. 7, when random access preambles are transmitted by using frequency hopping among a plurality of narrow bands (frequencies) for the PRACH, a connection request message may be transmitted to the radio base station by using the frequency in which the first random access preamble is transmitted. For example, when frequency hopping is applied to PRACH frequencies f1 and f2, a connection request message is reported in frequency f1, in which the first random access preamble is transmitted. Note that the structure to apply frequency hopping in subframe units is by no means limiting, and it is equally possible to execute in slot units as well. Consequently, the first random access preamble is not necessarily the random access preamble of the first subframe, and may be the random access preamble of the first-half slot. Also, the first random access preamble may be the first random access preamble per frequency hopping, or may be the first random access preamble at the beginning of random access. Also, according to the present embodiment, even when frequency hopping is applied to a random access preamble, the radio base station may transmit a random access response (message 2), a setup message (message 4) and so on in downlink resources that are linked with the random access preamble's signal sequence and/or frequency. In this way, by linking the resources for the connection request message (message 3) with the resources for the random access preamble, it is possible to reduce the overhead of the random access response (message 2).

Also, the frequency location of the connection request message may be reported directly in MTC SIBs or in the random access preamble. Similarly, the frequency locations of the random access response (message 2) and the setup message (message 4) may be reported directly in MTC SIBs or in the random access preamble.

Figure 8:
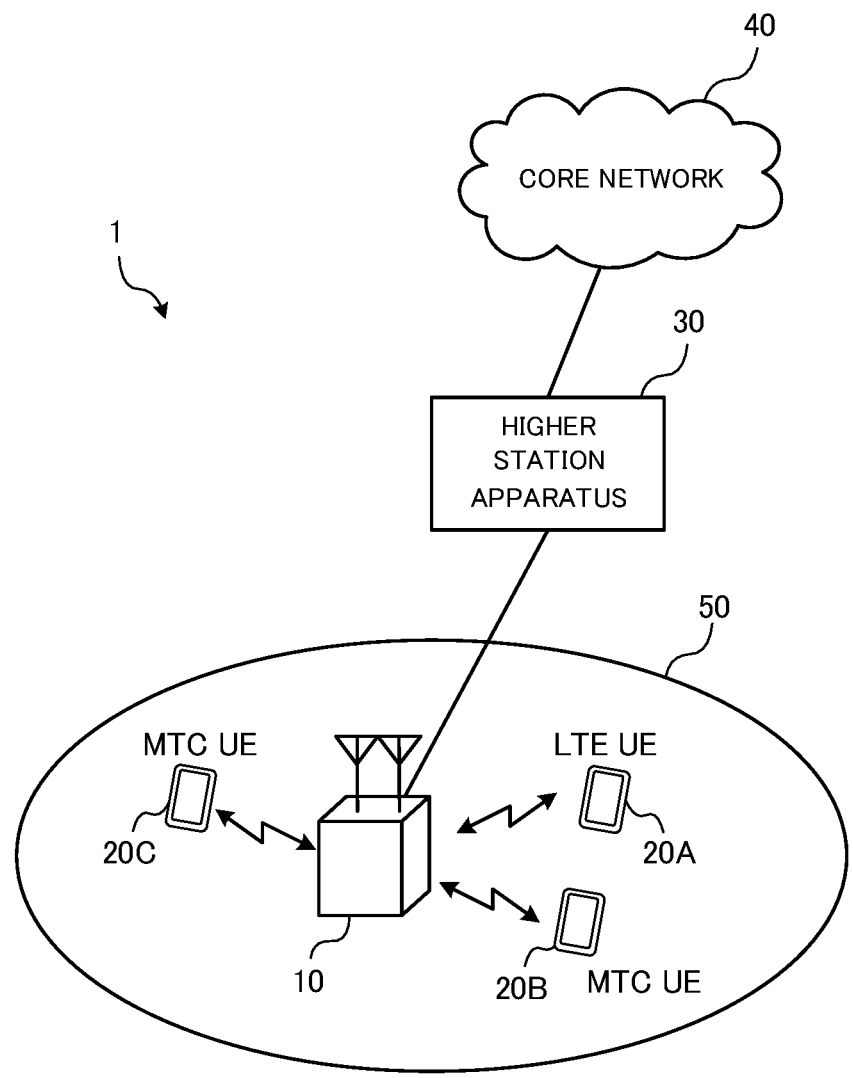
FIG. 8 is a diagram to show a schematic structure of a radio communication system according to an embodiment of the present invention.

Now, the radio communication system according to present embodiment will be described in detail. FIG. 8 is a diagram to show a schematic structure of the radio communication system according to the present embodiment. In this radio communication system, the above-described uplink frequency synchronization and random access procedure are employed. The uplink frequency synchronization and the random access procedure may be applied individually or may be applied in combination. Here, although MTC terminals will be shown as examples of user terminals in which the band to use is limited to narrow bands, the present invention is by no means limited to MTC terminals.

The radio communication system 1 shown in FIG. 8 is an example of employing an LTE system in the network domain of a machine communication system. The radio communication system 1 can adopt carrier aggregation (CA) and/or dual connectivity (DC) to group a plurality of fundamental frequency blocks (component carriers) into one, where the LTE system bandwidth constitutes one unit. Also, although, in this LTE system, the system band is configured to maximum 20 MHz in both the downlink and the uplink, this configuration is by no means limiting. Note that the radio communication system 1 may be referred to as "SUPER 3G," "LTE-A" (LTE-Advanced), "IMT-Advanced," "4G," "5G," "FRA" (Future Radio Access) and so on.

The radio communication system 1 is comprised of a radio base station 10 and a plurality of user terminals 20A, 20B and 20C that are connected with the radio base station 10 by radio. The radio base station 10 is connected with a higher station apparatus 30, and connected with a core network 40 via the higher station apparatus 30. Note that the higher station apparatus 30 may be, for example, an access gateway apparatus, a radio network controller (RNC), a mobility management entity (MME) and so on, but is by no means limited to these.

A plurality of user terminal 20A, 20B and 20C can communicate with the radio base station 10 in a cell 50. For example, the user terminal 20A is a user terminal that supports LTE (up to Rel-10) or LTE-Advanced (including Rel-10 and later versions) (hereinafter referred to as an "LTE terminal"), and the other user terminals 20B and 20C are MTC terminals that serve as communication devices in machine communication systems. Hereinafter the user terminals 20A, 20B and 20C will be simply referred to as "user terminals 20," unless specified otherwise.

Note that the MTC terminals 20B and 20C are terminals that support various communication schemes including LTE and LTE-A, and are by no means limited to stationary communication terminals such electric (gas) meters, vending machines and so on, and can be mobile communication terminals such as vehicles. Furthermore, the user terminals 20 may communicate with other user terminals directly, or communicate with other user terminals via the radio base station 10.

In the radio communication system 1, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier communication scheme to perform communication by dividing a frequency band into a plurality of narrow frequency bands (subcarriers) and mapping data to each subcarrier. SC-FDMA is a single-carrier communication scheme to mitigate interference between terminals by dividing the system band into bands formed with one or continuous resource blocks per terminal, and allowing a plurality of terminals to use mutually different bands. Note that the uplink and downlink radio access schemes are by no means limited to the combination of these.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and predetermined SIBs (System Information Blocks) are communicated in the PDSCH. Also, synchronization signals, the MIB (Master Information Block) and so on are communicated by the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ delivery acknowledgement signals (ACKs/NACKs) in response to the PUSCH are communicated by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data and higher layer control information are communicated by the PUSCH. Also, downlink radio quality information (CQI: Channel Quality Indicator), delivery acknowledgement signals and so on are communicated by the PUCCH. By means of the PRACH, random access preambles (RA preambles) for establishing connections with cells are communicated.

Figure 9:
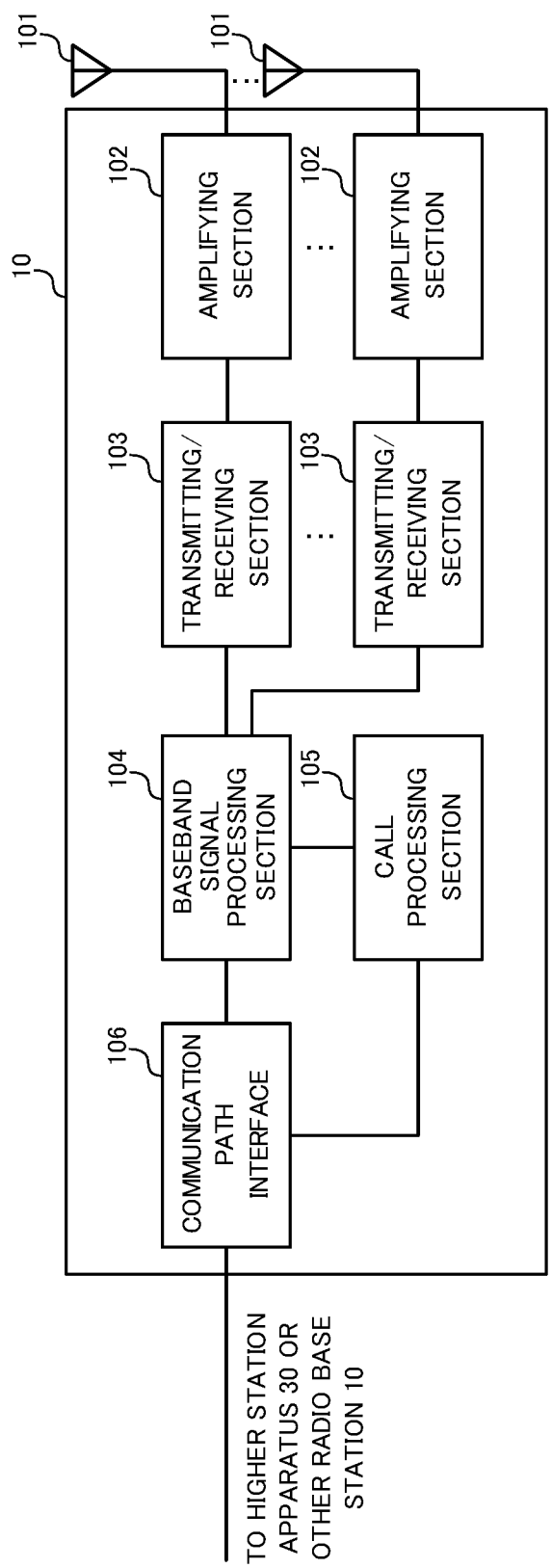
FIG. 9 is a diagram to show an example of overall structure of a radio base station according to the present embodiment.

FIG. 9 is a diagram to show an example of an overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that the transmitting/receiving sections 103 are comprised of transmitting sections and receiving sections.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Also, in the baseband signal processing section 104, system information for the narrow band to use for the PRACH is generated, in addition to the system information for the system band. The system information for the narrow band includes indication information of an uplink carrier frequency, such as, for example, the frequency value of an uplink carrier frequency, which shows the location of the narrow band's fundamental frequency, an offset value and so on.

Each transmitting/receiving section 103 converts baseband signals that are pre-coded and output from the baseband signal processing section 104 on a per antenna basis, into a radio frequency band and transmits the resulting signals. The radio frequency signals subjected to frequency conversion in the transmitting/receiving sections 103 are amplified in the amplifying sections 102, and transmitted from the transmitting/receiving antennas 101. The transmitting/receiving sections 103 can transmit and receive various signals in narrow bands that are limited more than the system band. For the transmitting/receiving sections 103, transmitters/receivers, transmitting/receiving circuits or transmitting/receiving devices that can be described based on common understanding of the technical field to which the present invention pertains can be used.

Meanwhile, as for uplink signals, radio frequency signals that are received in the transmitting/receiving antennas 101 are each amplified in the amplifying sections 102. Each transmitting/receiving section 103 receives uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. The communication path interface 106 transmits and receives signals to and from neighboring radio base stations 10 (backhaul signaling) via an inter-base station interface (for example, optical fiber, the X2 interface, etc.).

Figure 10:
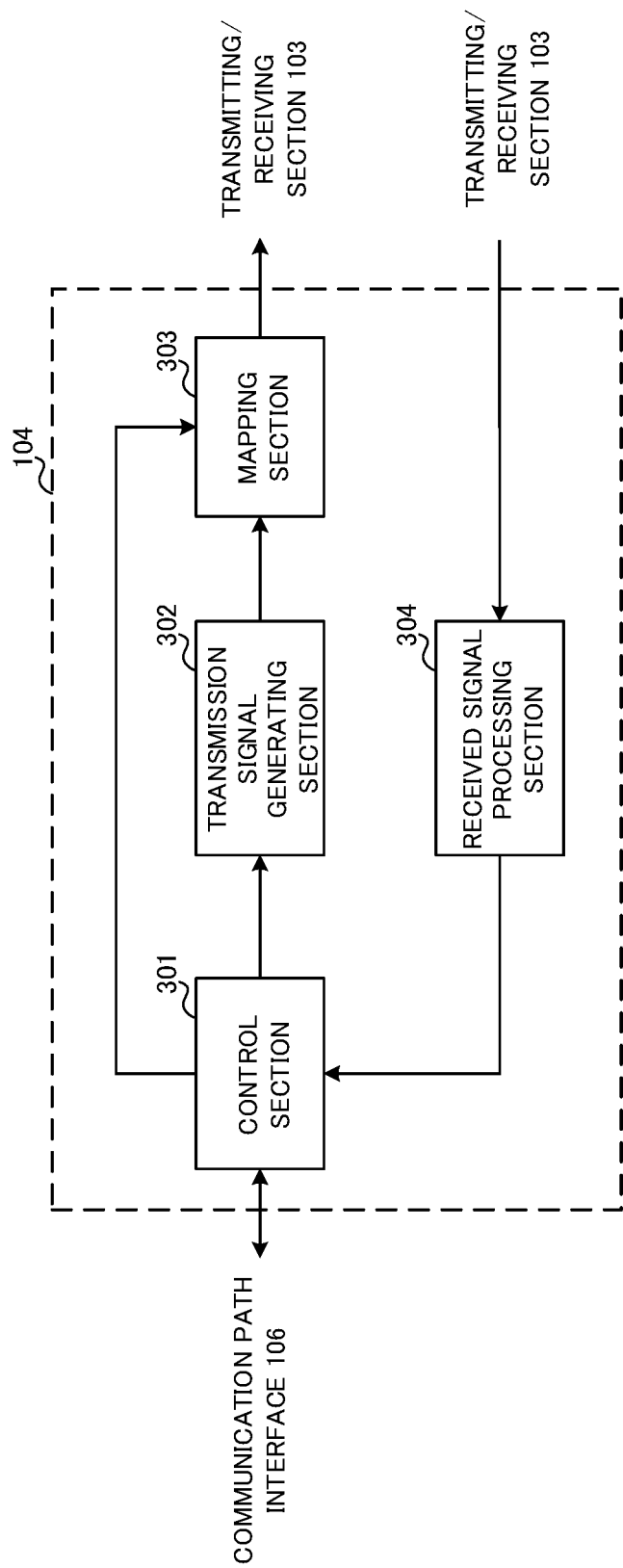
FIG. 10 is a diagram to show an example of a functional structure of a radio base station according to the present embodiment.

FIG. 10 is a diagram to show an example of a functional structure of a radio base station according to the present embodiment. Note that, although FIG. 10 primarily shows functional blocks that pertain to characteristic parts of the present embodiment, the radio base station 10 has other functional blocks that are necessary for radio communication as well. As shown in FIG. 10, the baseband signal processing section 104 has a control section (scheduler) 301, a transmission signal generating section (generating section) 302, a mapping section 303 and a received signal processing section 304.

The control section (scheduler) 301 controls the scheduling of (for example, allocates resources to) downlink data signals that are transmitted in the PDSCH and downlink control signals that are communicated in the PDCCH and/or the EPDCCH. Also, the control section 301 controls the scheduling of downlink reference signals such as system information, synchronization signals, CRSs (Cell-specific Reference Signals), CSI-RSs (Channel State Information Reference Signals) and so on. Also, the control section 301 controls the scheduling of uplink reference signals, uplink data signals that are transmitted in the PUSCH, uplink control signals that are transmitted in the PUCCH and/or the PUSCH, random access preambles that are transmitted in the PRACH, and so on.

The control section 301 controls the transmission signal generating section 302 and the mapping section 303 to allocate various types of signals to narrow bands and transmit these to the user terminals 20. For example, downlink system information (the MIB and SIBs) and the EPDCCH are allocated to narrow bandwidth. The system information may be allocated to the narrow band in the center frequency location of the system band, or may be allocated to a narrow band away from the center frequency location. Note that a random access preamble of the uplink may be allocated to one of a pair of narrow bands for the PRACH, which adjoin the band for an uplink control channel placed on either edge of the system band.

A random access response and a setup message of the downlink may be allocated to resources linked with the random access preamble's sequence and/or frequency. In this case, it is not necessary to designate the resources for the random access response by means of the EPDCCH. A connection request message of the uplink may be allocated to the same narrow band as that used for the immediately-preceding random access preamble. In this case, it is possible to reduce the amount of information of the random access response, which is used in the resource allocation for the connection request message. Furthermore, when a random access preamble is subjected to frequency hopping among a plurality of narrow bands for the PRACH, the uplink connection request message may be allocated to the frequency in which the first random access preamble is transmitted. For the control section 301, a controller, a control circuit or a control device that can be described based on common understanding of the technical field to which the present invention pertains can be used.

The transmission signal generating section 302 generates DL signals based on commands from the control section 301 and outputs these signals to the mapping section 303. For example, the transmission signal generating section 302 generates DL assignments, which report downlink signal allocation information, and UL grants, which report uplink signal allocation information, based on commands from the control section 301. Also, the downlink data signals are subjected to a coding process and a modulation process, based on coding rates and modulation schemes that are determined based on channel state information (CSI) from each user terminal 20 and so on.

Furthermore, the transmission signal generating section 302 generates system information for the narrow bands (MTC SIBs) based on commands from the control section 301. This system information may be generated to include an uplink carrier frequency (ul-CarrierFreq) for specifying the narrow band for the PRACH. In the system information for the narrow bands, the frequency values of a plurality of uplink carrier frequencies may be included as indication information, or the frequency value of an uplink carrier frequency may be included, with an addition of an offset value to apply to the frequency value (relative frequency offset), as indication information. Also, in the system information for the narrow bands, downlink frequency values may be included as indication information for specifying downlink narrow bands. Furthermore, in the system information for the narrow bands, the frequency locations of the random access response, the connection request message and the setup message (messages 2 to 4) may be included.

Also, the transmission signal generating section 302 generates a random access response as an acknowledgment signal in response to a random access preamble, based on a command from the control section 301. The resources that can be used for the narrow band for the PRACH are limited to 6 resource blocks, and therefore it is possible to reduce the number of the resource block assignment bits included in the random access response and reduce the amount of information. Furthermore, based on a command from the control section 301, the transmission signal generating section 302 generates a setup message as an acknowledgment signal in response to a connection request message. For the transmission signal generating section 302, a signal generator or a signal generating circuit that can be described based on common understanding of the technical field to which the present invention pertains can be used.

The mapping section 303 maps the downlink signals generated in the transmission signal generating section 302 to radio resources (maximum 6 resource blocks) based on commands from the control section 301, and outputs these to the transmitting/receiving sections 103. For the mapping section 303, mapper, a mapping circuit or a mapping device that can be described based on common understanding of the technical field to which the present invention pertains can be used.

The received signal processing section 304 performs the receiving processes (for example, demapping, demodulation, decoding and so on) of the UL signals that are transmitted from the user terminals (for example, delivery acknowledgement signals (HARQ-ACKs), data signals that are transmitted in the PUSCH, random access preambles that are transmitted in the PRACH, and so on). The processing results are output to the control section 301.

Also, by using the received signals, the received signal processing section 304 may measure the received power (for example, the RSRP (Reference Signal Received Power)), the received quality (for example, the RSRQ (Reference Signal Received Quality)), channel states and so on. The measurement results may be output to the control section 301. The receiving process section 304 can be constituted by a signal processor, a signal processing circuit or a signal processing device, and a measurer, a measurement circuit or a measurement device that can be described based on common understanding of the technical field to which the present invention pertains.

Figure 11:
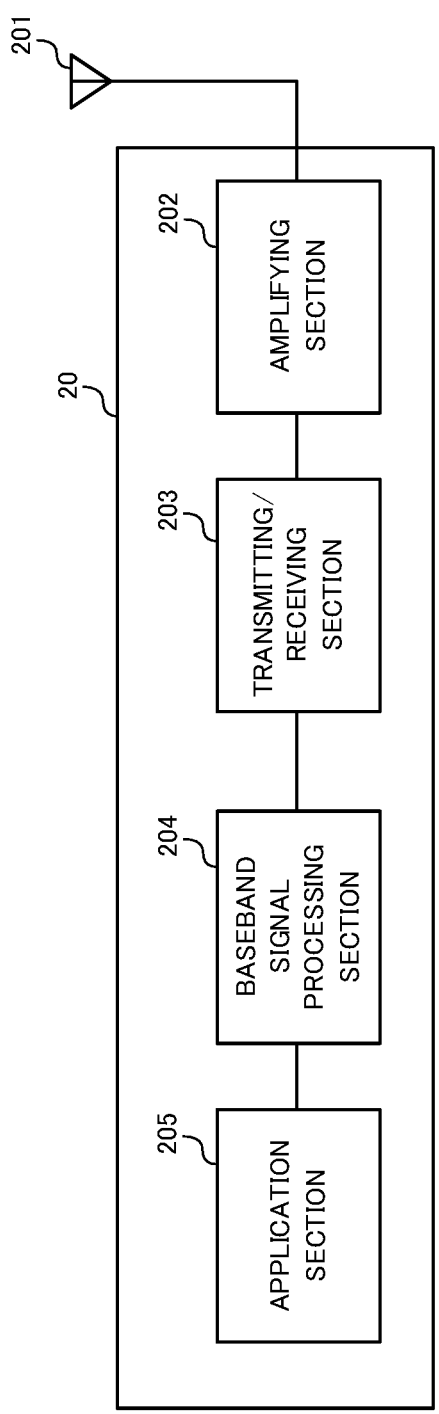
FIG. 11 is a diagram to show an example of an overall structure of a user terminal according to the present embodiment.

FIG. 11 is a diagram to show an example of an overall structure of a user terminal according to the present embodiment. Note that, although the details will not be described here, normal LTE terminals may operate and act as MTC terminals. A user terminal 20 has a plurality of transmitting/receiving antennas 201, amplifying sections 202, transmitting/receiving sections 203, a baseband signal processing section 204 and an application section 205. Note that, the transmitting/receiving sections 203 are comprised of transmitting sections and receiving sections. Also, the user terminal 20 has a plurality of transmitting/receiving antennas 201, amplifying sections 202, transmitting/receiving sections 203 and so on.

Radio frequency signals that are received in a plurality of transmitting/receiving antennas 201 are each amplified in the amplifying sections 202. Each transmitting/receiving section 203 receives the downlink signals amplified in the amplifying sections 202. The received signals are subjected to frequency conversion and converted into the baseband signal in the transmitting/receiving sections 203, and output to the baseband signal processing section 204. For the transmitting/receiving sections 203, transmitters/receivers, transmitting/receiving circuits or transmitting/receiving devices that can be described based on common understanding of the technical field to which the present invention pertains can be used.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to each transmitting/receiving section 203. The baseband signal that is output from the baseband signal processing section 204 is converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Figure 12:
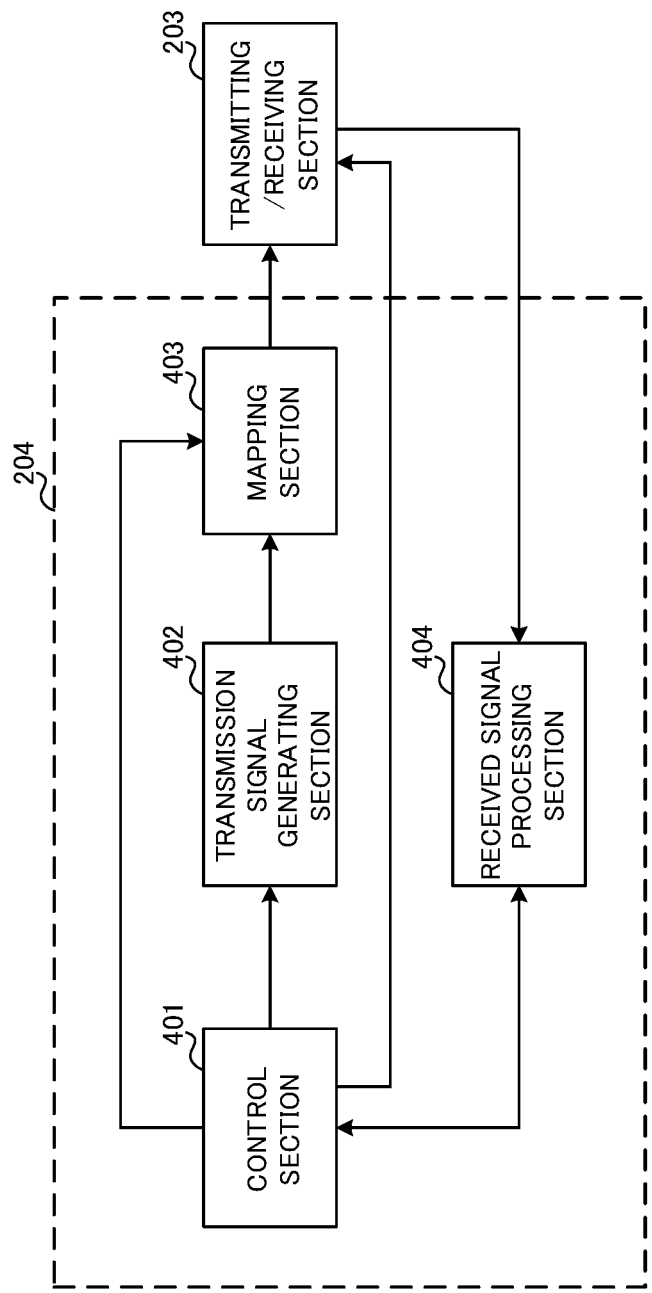
FIG. 12 is a diagram to show an example of a functional structure of a user terminal according to the present embodiment.

FIG. 12 is a diagram to show an example of a functional structure of a user terminal according to the present embodiment. Note that, although FIG. 12 primarily shows functional blocks that pertain to characteristic parts of the present embodiment, the user terminal 20 has other functional blocks that are necessary for radio communication as well. As shown in FIG. 12, the baseband signal processing section 204 provided in the user terminal 20 has a control section 401, a transmission signal generating section 402, a mapping section 403 and a received signal processing section 404.

The control section 401 acquires the downlink control signals (signals transmitted in the PDCCH/EPDCCH) and downlink data signals (signals transmitted in the PDSCH) transmitted from the radio base station 10, from the received signal processing section 404. The control section 401 controls the generation of uplink control signals (for example, delivery acknowledgement signals (HARQ-ACKs) and so on) and uplink data signals based on the downlink control signals, the results of deciding whether or not retransmission control is necessary for the downlink data signals, and so on. To be more specific, the control section 401 controls the transmission signal generating section 402 and the mapping section 403.

Furthermore, the control section 401 controls the transmitting/receiving sections 203 based on the system information for narrow bands (MTC SIBs). The control section 401 picks up the indication information of an uplink carrier frequency from the system information for narrow bands, and controls the transmitting/receiving sections 203 to tune to the frequency value of the uplink carrier frequency specified by the indication information. For example, if a plurality of frequency values are reported as indication information of an uplink carrier frequency, the transmitting/receiving sections 203 are tuned to one of the plurality of frequency values. Also, when a plurality of frequency values and offset values are reported as indication information of an uplink carrier frequency, the transmitting/receiving sections 203 are tuned to one among the frequency values and other frequency values that are determined by applying the offset values to the frequency values.

In this case, a plurality of narrow bands are specified by the indication information of an uplink carrier frequency specifies, and the transmission frequencies in the transmitting/receiving sections 203 may be controlled so that, if the transmission of a random access preamble fails in one of the plurality of narrow bands, the random access preamble is transmitted in another one of the plurality of narrow bands. Also, if the system information for narrow bands includes indication information of a downlink frequency, the transmitting/receiving sections 203 are tuned to the downlink frequency value shown in the indication information. For the control section 401, a controller, a control circuit or a control device that can be described based on common understanding of the technical field to which the present invention pertains can be used.

The transmission signal generating section 402 generates UL signals based on commands from the control section 401, and outputs these signals to the mapping section 403. For example, the transmission signal generating section 402 generates uplink control signals such as delivery acknowledgement signals (HARQ-ACKs), channel state information (CSI) and so on, based on commands from the control section 401. Also, the transmission signal generating section 402 generates uplink data signals based on commands from the control section 401. For example, when a UL grant is contained in a downlink control signal reported from the radio base station 10, the control section 401 commands the transmission signal generating section 402 to generate an uplink data signal.

Also, when system information for narrow bands (MTC SIB) is received in the received signal processing section 404, the transmission signal generating section 402 generates a random access preamble based on a command from the control section 401. Note that the frequency locations of a random access response, a connection request message, and a setup message (messages 2 to 4) may be included in the random access preamble. Furthermore, when a random access response is received in the received signal processing section 404, the transmission signal generating section 402 generates a connection request message in accordance with the parameters of the random access response. For the transmission signal generating section 402, a signal generator, a signal generating circuit or a signal generating device that can be described based on common understanding of the technical field to which the present invention pertains can be used.

The mapping section 403 maps the uplink signals generated in the transmission signal generating section 402 to radio resources (maximum 6 resource blocks) based on commands from the control section 401, and output these to the transmitting/receiving sections 203. For the mapping section 403, mapper, a mapping circuit or a mapping device that can be described based on common understanding of the technical field to which the present invention pertains can be used.

The received signal processing section 404 performs receiving processes (for example, demapping, demodulation, decoding and so on) of DL signals (for example, downlink control signals transmitted from the radio base station, downlink data signals transmitted in the PDSCH, and so on). The received signal processing section 404 outputs the information received from the radio base station 10, to the control section 401. The received signal processing section 404 outputs, for example, broadcast information, system information, RRC signaling, DCI and so on, to the control section 401.

Also, the received signal processing section 404 may measure the received power (RSRP), the received quality (RSRQ) and channel states, by using the received signals. Note that the measurement results may be output to the control section 401. The received signal processing section 404 can be constituted by a signal processor, a signal processing circuit or a signal processing device, and a measurer, a measurement circuit or a measurement device that can be described based on common understanding of the technical field to which the present invention pertains.

Note that the block diagrams that have been used to describe the above embodiments show blocks in functional units. These functional blocks (components) may be implemented in arbitrary combinations of hardware and software. Also, the means for implementing each functional block is not particularly limited. That is, each functional block may be implemented with one physically-integrated device, or may be implemented by connecting two or more physically-separate devices via radio or wire and using these multiple devices.

For example, part or all of the functions of radio base stations 10 and user terminals 20 may be implemented using hardware such as ASICs (Application-Specific Integrated Circuits), PLDs (Programmable Logic Devices), FPGAs (Field Programmable Gate Arrays), and so on. Also, the radio base stations 10 and user terminals 20 may be implemented with a computer device that includes a processor (CPU), a communication interface for connecting with networks, a memory and a computer-readable storage medium that holds programs.

Here, the processor and the memory are connected with a bus for communicating information. Also, the computer-readable recording medium is a storage medium such as, for example, a flexible disk, an opto-magnetic disk, a ROM, an EPROM, a CD-ROM, a RAM, a hard disk and so on. Also, the programs may be transmitted from the network through, for example, electric communication channels. Also, the radio base stations 10 and user terminals 20 may include input devices such as input keys and output devices such as displays.

The functional structures of the radio base stations 10 and user terminals 20 may be implemented with the above-described hardware, may be implemented with software modules that are executed on the processor, or may be implemented with combinations of both. The processor controls the whole of the user terminals by running an operating system. Also, the processor reads programs, software modules and data from the storage medium into the memory, and executes various types of processes. Here, these programs have only to be programs that make a computer execute each operation that has been described with the above embodiments. For example, the control section 401 of the user terminals 20 may be stored in the memory and implemented by a control program that operates on the processor, and other functional blocks may be implemented likewise.

Now, although the present invention has been described in detail above, it should be obvious to a person skilled in the art that the present invention is by no means limited to the embodiments described herein. For example, the above-described embodiments may be used individually or in combinations. The present invention can be implemented with various corrections and in various modifications, without departing from the spirit and scope of the present invention defined by the recitations of claims. Consequently, the description herein is provided only for the purpose of explaining example s, and should by no means be construed to limit the present invention in any way.

The disclosures of Japanese Patent Application No. 2014-226412, filed on Nov. 6, 2014, and Japanese Patent Application No. 2015-080327, filed on Apr. 9, 2015, including the specifications, drawings and abstracts, are incorporated herein by reference in their entirety.

The invention claimed is:

1. A terminal operating with a narrow band that is a part of a system band, the terminal comprising:
a transmitter that transmits a random access preamble; and
a receiver that receives a random access response in a resource of the narrow band that is linked with a signal sequence of the random access preamble,
wherein the receiver receives a frequency offset value for a Physical Random Access Channel (PRACH) of the narrow band,
wherein the transmitter transmits the random access preamble in accordance with the frequency offset value for the PRACH, and
wherein the transmitter transmits a connection request message in a resource that is indicated by a random access response grant.

2. The terminal according to claim 1, wherein:
the transmitter transmits the connection request message to a radio base station in a narrow band that is used for transmission of an immediately-preceding random access preamble.

3. A radio base station communicating with a terminal that operates with a narrow band that is a part of a system band, the radio base station comprising:
a receiver that receives a random access preamble; and
a transmitter that transmits a random access response in a resource of the narrow band that is linked with a signal sequence of the random access preamble,
wherein the transmitter transmits a frequency offset value for a Physical Random Access Channel (PRACH) of the narrow band,
wherein the receiver receives the random access preamble in accordance with the frequency offset value for the PRACH, and
wherein the receiver receives a connection request message in a resource that is indicated by a random access response grant.

4. A radio communication method for a terminal operating with a narrow band that is a part of a system band, the radio communication method comprising:
transmitting a random access preamble;
receiving a random access response in a resource of the narrow band that is linked with a signal sequence of the random access preamble;
receiving a frequency offset value for a Physical Random Access Channel (PRACH) of the narrow band;
transmitting the random access preamble in accordance with the frequency offset value for the PRACH; and
transmitting a connection request message in a resource that is indicated by a random access response grant.

* * * * *